(12) United States Patent
Kulkarni et al.

(10) Patent No.: US 8,179,837 B2
(45) Date of Patent: May 15, 2012

(54) TECHNIQUE FOR LOW-OVERHEAD NETWORK STATE DISSEMINATION FOR MANAGEMENT OF MOBILE AD-HOC NETWORKS

(75) Inventors: Amit Kulkarni, Clifton Park, NY (US); Richard Spackmann, Saratoga Springs, NY (US); Giri Kuthethoor, Boyds, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 1339 days.

(21) Appl. No.: 11/776,829

(22) Filed: Jul. 12, 2007

(65) Prior Publication Data

US 2009/0016262 A1    Jan. 15, 2009

(51) Int. Cl.
*H04W 4/00* (2009.01)
(52) U.S. Cl. .......................... 370/328; 370/338; 455/522
(58) Field of Classification Search .................. 370/238, 370/392, 338, 315, 401, 445, 254, 216, 328, 370/235; 379/398; 709/242, 227; 455/11.1, 455/450
See application file for complete search history.

(56) References Cited

U.S. PATENT DOCUMENTS

| | | | | |
|---|---|---|---|---|
| 6,961,310 B2* | 11/2005 | Cain | ............................. | 370/238 |
| 7,418,494 B2* | 8/2008 | Dahlin et al. | ................. | 709/224 |
| 7,472,183 B1* | 12/2008 | Dini et al. | ..................... | 709/224 |
| 2002/0018448 A1* | 2/2002 | Amis et al. | ..................... | 370/255 |
| 2002/0103893 A1* | 8/2002 | Frelechoux et al. | .......... | 709/223 |
| 2003/0041150 A1* | 2/2003 | Passman et al. | .............. | 709/227 |
| 2004/0018839 A1* | 1/2004 | Andric et al. | ................. | 455/433 |
| 2004/0044762 A1* | 3/2004 | Peacock | ........................ | 709/224 |
| 2004/0054680 A1* | 3/2004 | Kelley et al. | ................... | 707/100 |
| 2004/0128387 A1* | 7/2004 | Chin et al. | ..................... | 709/227 |
| 2005/0113084 A1* | 5/2005 | Scaglione et al. | ......... | 455/426.2 |
| 2005/0117530 A1* | 6/2005 | Abraham et al. | ............. | 370/310 |
| 2005/0141706 A1* | 6/2005 | Regli et al. | ...................... | 380/44 |
| 2005/0220106 A1* | 10/2005 | Raverdy et al. | ............... | 370/392 |
| 2005/0286536 A1* | 12/2005 | Steinheider et al. | ..... | 370/395.52 |
| 2006/0067226 A1* | 3/2006 | Chandra et al. | ............... | 370/235 |
| 2006/0211436 A1* | 9/2006 | Paila et al. | ..................... | 455/509 |
| 2006/0227724 A1* | 10/2006 | Thubert et al. | ................. | 370/254 |
| 2006/0248385 A1* | 11/2006 | Rahman et al. | ................. | 714/12 |
| 2006/0252367 A1* | 11/2006 | Haartsen | ....................... | 455/11.1 |
| 2007/0082677 A1* | 4/2007 | Hart et al. | ................... | 455/456.1 |
| 2007/0153764 A1* | 7/2007 | Thubert et al. | ................. | 370/351 |
| 2008/0049787 A1* | 2/2008 | McNaughton et al. | ........ | 370/468 |
| 2008/0080436 A1* | 4/2008 | Sandhu et al. | ................ | 370/338 |
| 2008/0139199 A1* | 6/2008 | Plestid | ........................ | 455/426.1 |
| 2008/0175149 A1* | 7/2008 | Andrews et al. | .............. | 370/235 |
| 2008/0228938 A1* | 9/2008 | Plamondon | ................... | 709/233 |
| 2008/0253327 A1* | 10/2008 | Kohvakka et al. | ............. | 370/330 |
| 2009/0073916 A1* | 3/2009 | Zhang et al. | ................... | 370/315 |

OTHER PUBLICATIONS

Wireless Ad Hoc Networks, p. 1-11, Mar. 27, 2003. p. 4: Querying ability and data fusion.*

* cited by examiner

*Primary Examiner* — Nick Corsaro
*Assistant Examiner* — Mahendra Patel
(74) *Attorney, Agent, or Firm* — Oliff & Berridge, PLC (57) ABSTRACT

Aspects of the disclosure can provide an ad-hoc network having a clusterhead node and a plurality of nodes associated with the clusterhead, at least one of the plurality of nodes is a remote node and at least one is an intermediate node, the remote node can indirectly communicate with the clusterhead through the intermediate node. The remote node can also transmit network state information at a higher rate, but in lesser amounts, than the intermediate node.

14 Claims, 5 Drawing Sheets

| Node | Transmission Rate | Load | Dropped Packets | Bandwidth Capacity |
|---|---|---|---|---|
| 130 B | 3 MIBs every 10 seconds | 1000 packets/minute | 10% | 5 Mb/second |
| 130 C | 3 MIBs every 10 seconds | 500 packets/minute | 5% | 10 Mb/second |
| 130 D | 3 MIBs every 10 seconds | 2000 packets/minute | 10% | 10 Mb/second |
| 130 E | 3 MIBs every 10 seconds | 1000 packets/minute | 20% | 15 Mb/second |
| 130 F | 3 MIBs every 10 seconds | 1500 packets/minute | 10% | 5 Mb/second |
| 130 G | 2 MIBs every 5 seconds | 500 packets/minute | 5% | 20 Mb/second |
| 130 H | 2 MIBs every 5 seconds | 2000 packets/minute | 10% | 5 Mb/second |

FIG. 3

| Clusterhead | Network State Information | | |
|---|---|---|---|
| | Load | Dropped Packets | Bandwidth Capacity |
| 110 A | 2000 packets/second | 15% | 10 Mb/second |
| 120 A | 1500 packets/second | 5% | 15 Mb/second |
| 130 A | 1000 packets/second | 10% | 10 Mb/second |

TECHNIQUE FOR LOW-OVERHEAD NETWORK STATE DISSEMINATION FOR MANAGEMENT OF MOBILE AD-HOC NETWORKS

BACKGROUND

Generally, ad-hoc networks are dynamic networks that include a set of nodes with properties that change over time. One example of an ad-hoc network is a mobile ad-hoc network (MANET) where the nodes are free to move within or through a network environment and able to communicate with each other via wireless communication links. In such a network, the nodes are free to move randomly and organize themselves arbitrarily within the network environment. The movement of mobile nodes can change the properties of the nodes, such as a node's ability to transmit or receive data. Further, the movement of mobile nodes can cause that node to be added to or removed from a particular ad-hoc network environment or portion of that environment. Accordingly, by their nature, the topography of an ad-hoc network may change rapidly and unpredictably overtime.

SUMMARY

Generally, a static network is a network in which a relationship between nodes does not vary over time. This fixed relationship is largely a result of the infrastructure hardwiring the various network components together. Thus, once established, the network and network hierarchy is static. An example of a static network would be a network that is set up within an office building, such that a node or computer in each office is hardwired to the network within the network hierarchy. The static network can also include an administrative or manager node that runs network management software to manage the various nodes. In such a static network, the connections between nodes and manager nodes on the network rarely change, and thus the network has a static hierarchy.

Management techniques for a static network, such as a local area network (LAN), exist that can be used to manage a group of nodes connected to the network. In exemplary management techniques, each node of a network can transmit its complete state information to a manager node. In such technique, the transmitted state information passes through every intermediate router. Because a router can be connected to multiple host nodes, all the information transmitted by the host nodes can be received and forwarded by the router towards the manager node.

An example of a management technique for collecting and organizing information, such as network state information for the purpose of network management, over a network is the simple network management protocol (SNMP). Under the SNMP protocol, a central or administrator node requests information, such as operational data, from various agent nodes. In response, the agent nodes can collect the requested information from any network component assigned to that agent node. Once collected, the information can be transmitted back to the central node for further processing.

To the contrary, in an ad-hoc network, the infrastructure can be constantly changing. Further, in such a system, every node is capable of being a router and may be responsible for forwarding packets from other nodes in the network. In the ad-hoc network environment, groups of nodes can be formed into scalable configuration consisting of groups of co-located nodes aggregated into clusters with a node in each cluster acting as a clusterhead. The clusterhead node is generally responsible for managing communication between nodes in its cluster and nodes that are in other clusters. Of course, the clusterhead nodes of each cluster may discover each other and establish routing between themselves. The clusterhead nodes thus form an ad-hoc information structure, or background, that is used by the non-clusterhead nodes for communication. Ad-hoc formation of groups of nodes can be necessary in, for example, military battlefield networks, sensors and fleets of vehicles. These groups of nodes ideally are formed and scaled rapidly to minimize network diameter so that information may be passed between nodes most efficiently and non-mission critical messaging overhead may be minimized. The distribution of clusterheads and the size of the clusters are important. Techniques and algorithms for clustering nodes of an ad-hoc network are disclosed, for example, in U.S. patent application Ser. No. 11/471,901 filed on Jun. 21, 2006, which is hereby incorporated by reference in its entirety.

Aspects of the disclosure can provide an ad-hoc network having a clusterhead node and a plurality of nodes associated with the clusterhead, at least one of the plurality of nodes is a remote node and at least one is an intermediate node, the remote node can indirectly communicate with the clusterhead through the intermediate node. The remote node can also transmit network state information at a higher rate, but in lesser amounts, than the intermediate node.

Further, according to the disclosure, the intermediate node can receive the network state information transmitted by the remote node and subsequently re-transmit the network state information received from the remote node in a summarized form. The intermediate node can also summarize the network state information of the remote node by combining at least a portion of the network state information of the remote node with the network state information of the intermediate node before re-transmitting. Further, the intermediate node can summarize the network state information of the remote node by averaging at least a portion of the network state information of the remote node with the network state information of the intermediate node.

According to the disclosure, the network state information can include at least one of load, dropped packets and bandwidth capacity. The network state information can include management information based (MIB). Additionally, each node can be a wireless node including a controller coupled to a receiver, transmitter and memory, the network state information of the node being stored in the memory and transmitted under the control of the controller by the transmitter, along with any network state information previously received by the receiver.

Additionally, each of the plurality of nodes can collect network state information and transmit at least a portion of the collected network state information at a predetermined rate, where the remote nodes transmit a smaller amount of information at a higher rate relative to that of the intermediate node, and the intermediate node can transmit a larger amount of information at a lower rate relative to that of the remote node. The intermediate node can receive the network state information transmitted by the remote node and subsequently re-transmit the network state information received from the remote node along with the network state information of the intermediate node in a summarized form.

Further, each node can include a proximity device that determines proximity to the clusterhead, and a determination of whether a node is an intermediate node or remote node can be made based on a determination of the proximity device. A node's proximity can be measured by at least one of distance to the clusterhead, hops to the clusterhead, and signal strength of the node or surrounding nodes. Further, a node's proximity can be based on GPS measurements.

BRIEF DESCRIPTION OF THE DRAWINGS

Embodiments of the invention will be described with reference to the following drawings, wherein like numerals designate like elements, and wherein.

DETAILED DESCRIPTION OF EMBODIMENTS

A wireless ad-hoc network is a type of computer network in which the communication links are mainly wireless. The network is ad-hoc, or not planned, because each node belonging to the network is willing to forward data from other nodes. A determination of which nodes forward data can be made dynamically based on the networks connectivity and/or topography. This is in contrast to the above-described network technologies, such as SNMP, in which some designated nodes, usually with custom hardware and variously known as routers, switches, hubs and the firewalls, perform the task of forwarding the data. Because of their minimal configuration requirements and quick deployment capability ad-hoc networks can be highly suitable for emergency situations like natural or human-induced disasters, military conflicts, emergency medical situations, and the like.

Unlike the static network, the ad-hoc network generally has little or no hardwired infrastructure in order to accommodate the mobility of the wireless nodes. Thus, network management techniques that are useful for a static network, such as SNIP, are not as useful in a dynamic ad-hoc network environment. For example, to maintain a static network hierarchy in an ad-hoc network requires large amounts of overhead, such as bandwidth, which can be a scarce resource in a wireless network environment. Errors in transmissions due to collision and packet losses over the wireless transmission can further exacerbate this problem.

Figure 1:
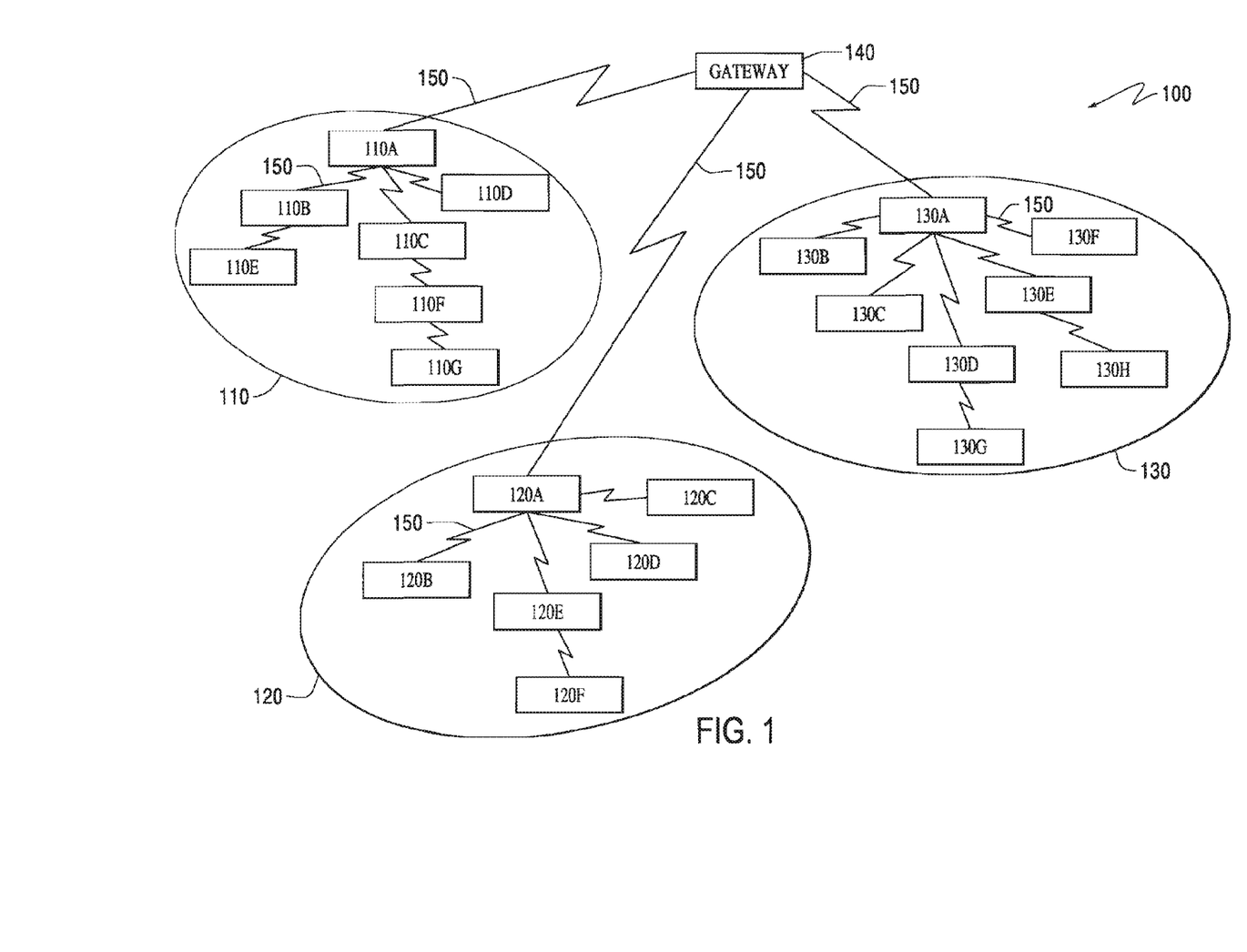
FIG. 1 shows an exemplary ad-hoc network.

FIG. 1 shows an exemplary ad-hoc network 100. As shown, the ad-hoc network 100 includes nodes 110A-G, 120A-F and 130A-H that are grouped into ad-hoc clusters 110, 120 and 130, respectively. The ad-hoc network can also include another node or gateway 140. Each of the nodes within the ad-hoc network 100 can be wirelessly linked to each other via communication links 150. For the sake of clarity, only a portion of the communication links that are required for the example of operation described below is shown. It should be understood that any node can communicate with another node.

Within each of the ad-hoc clusters 110, 120 and 130, a node can be designated as a clusterhead. The clusterhead can coordinate communication between nodes in its respective cluster and nodes that are in other clusters. For example, as shown in FIG. 1, each of the other nodes 110B-G, 120B-F and 130B-H wirelessly communicate, directly or indirectly, via communication link 150 with their respective clusterheads 110A, 120A, 130A. Further, each of the clusterheads 110A, 120A and 130A can wirelessly communicate with the gateway 140 or other clusterheads via a wireless communication link 150.

The nodes 110A-G, 120A-F, 130A-H and gateway 140 can be devices of any type that allow for the transmission and/or reception of communication signals. For example, the nodes can be computers, personal digital assistants, satellite or cellular telephones, satellite or cellular videophones, and the like. For the purposes of the following description, it will be assumed that the nodes are computers capable of communicating wirelessly with each other. Additionally, the computers may be integrated into a vehicle, such as automobile, aircraft, tank, and the like.

The nodes are in communication with each other through the wireless communication links 150. These communication links 150 may be any type of connection that allows for the transmission of information. Some examples of transmission techniques include radio frequency communication, satellite based communication, and the like. Of course, these transmission techniques can be utilized in conjunction with coding or encrypting technologies.

The clusters 110, 120 and 130 can be dynamically formed by any known technology. As described above, the formation of clusters can be made dynamically based on connectivity and/or topography. For example, any technique may be used, such as graph theory algorithms, voting or election algorithms, evolutionary algorithms, and the like.

The clusterheads 110A, 120A and 130A can be a node within a cluster that is the primary point of communication for that cluster. Thus, node-to-node, cluster-to-cluster and cluster-to-gateway communications can be accomplished through the clusterheads 110A, 120A and 130A. Such clusterheads can be dynamically selected from a predefined cluster of nodes based on any known selection techniques.

A gateway node 140 may be located at edges of clusters and associated with multiple clusters. The gateway node can administer the ad-hoc network based on network state information that the gateway receives from the clusters of the network. To gather the network state information, the gateway node 140 can communicate with the clusterheads 110A, 120A, 130A of each cluster 110, 120, 130 via communication links 150. As described in greater detail below, each of the nodes of a cluster are periodically transmitting network state information to the clusterheads at various transmission rates and different levels of summarization.

During operation of the ad-hoc network 100, a portion of the available bandwidth is required for administration of the ad-hoc network 100. Administration can include any task that requires the ad-hoc network 100 to carry data other than application data. Such tasks include monitoring network state information of individual nodes for load, error rates, malfunctions of the nodes, bandwidth capacity, signal strength and the like. Generally, it is desirable to minimize the amount of bandwidth necessary for administration so that the maximum amount of bandwidth is available for application data. As described in greater detail below, a technique for low-overhead network state dissemination minimizes an amount of bandwidth required to administer the ad-hoc network 100 by summarizing network state information transmitted by individual nodes before re-transmitting the information to a next level of node within the ad-hoc network hierarchy.

As described above, administration of the ad-hoc network 100 generally requires knowledge about the performance or health of the individual nodes and clusters that make up the network, generally referred to as network state information. Network state information of individual nodes can include recent historical parameters, such as a node's load, including the number of packets per minute that the node handled, any delay or dropped packets that the node had experienced, errors that the node may have introduced, and the like. An exemplary embodiment of the invention can use management information base RIB) to manage the nodes of the ad-hoc network, however, it should be understood that the invention is not limited to MIB. Further, each of the nodes can include some mechanism, such as a memory, for storing network state information of the nodes. Upon request, at predetermined intervals, or upon the occurrence of an event, the nodes can transmit the network state information to other nodes of the ad-hoc network.

Referring to the ad-hoc network, 100 shown in FIG. 1, during operation, the nodes 110A-G, 120A-F, 130 A-H can each collect a set of their own network state information, such as those described above. The level of detail in the performance parameters collected by the individual nodes 110A-G, 120A-F, 130A-H can be high. In other words, each node 110A-G, 120A-F, 130A-H can monitor various aspects of their own performance and collect very detailed data on its operation. As described above, once collected, the data may be stored by the node, such as in a resident memory.

In a preferred embodiment, the clusterhead nodes 110A, 120A, 130A of the respective clusters 110, 120, 130 receive the network state information of the nodes belonging to their cluster at predetermined intervals. Also known as a "push model," each node 110B-G, 120B-F, 130B-H transmits network state information at a predetermined time interval so that the information eventually arrives at respective clusterheads 110A, 120A, 130A. The transmitted network state information can be the complete set, a subset or a summarization of the network state information stored in each node 110B-G, 120B-F, 130B-H. Of course, each of the clusterheads 110A, 120A, 130A will already have their own network state information. Network state information for the clusters can ultimately be transmitted to the gateway 140.

The time interval at which a node transfers state information, as well as the amount of network state information that is transmitted each time interval, can be dependent on characteristics of the individual node, such as proximity to a respective clusterhead. In addition to proximity to the clusterhead, the transmission rate and transmission content can be based on other metrics, such as signal strength of the node or surrounding nodes, number of hops away from the clusterhead, number of neighboring nodes to the transmitting node, and the like. As described in greater detail below, nodes at an outer edge of the cluster, regardless of the metric used to make such a determination, will generally transmit less network state information per transmission, but at a higher rate than nodes intermediate to the clusterhead.

Figure 2:
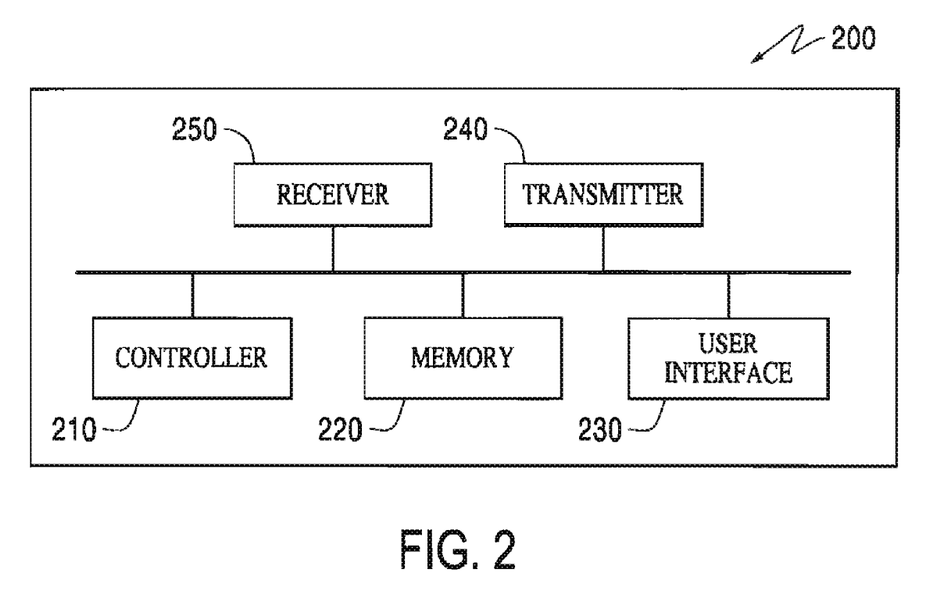
FIG. 2 is an exemplary block diagram of a node.

FIG. 2 is an exemplary block diagram of a node 200. The node includes a controller 210, a memory 220, a user interface 230, a transmitter 240 and a receiver 250. The above components are coupled together through a control/signal bus 252. The above components 210-250 are only exemplary, and any other components may also be incorporated into the node 200.

The controller 210 controls the operation of the node 200. For example, the node 200 is able to transmit and receive data within the ad-hoc network under the instruction of the controller 210. Also under the instruction of the controller 210, a user can interact with the node 200, such as a keyboard of a personal computer, via the user interface 230. The user interface 230 can include any input device, such as a mouse, keyboard, touch screen display, and the like. The controller 210 is also able to gather network state information for the node 200, for example, by monitoring its own performance and/or environment. The controller can store the network state information in the storage 220.

During operation, the controller 210 can either transmit or receive network state information to or from other nodes. As described in greater detail below, the controller 210 can store data received via the receiver 230 in the storage 220. Network state information that is received from other nodes can be summarized by the controller 210 before being stored in storage 210. Subsequently, the controller 210 can transmit the summarized information via the transmitter 240 to other nodes. Of course, above architecture is exemplary only. Other architectures of components may be used without departing from the spirit and scope of the invention.

In operation, each of the nodes collect network state information concerning their own operation. Periodically, a node will transmit its network state information to other nodes. As described above, the periodic transmission and the content of the transmission can be based on a number of factors, such as a node's proximity to the clusterhead, signal strength of the node and/or of the surrounding nodes, number of neighboring nodes, number of "hops" between the node and the clusterhead, and the like. For example, if a node is remotely located from a clusterhead, then that node may send less network state information per transmission, but can transmit at a higher rate. Conversely, a node that is less remote from the clusterhead can transmit more network state information, but at a lower rate. Similarly, a node that has a weak communication link, such as a weak signal strength between itself and surrounding nodes, can transmit less state information per periodic transmission, but more often, relative to a node with a robust communication link that can transmit more state information per periodic transmission, but less often. A weak communication link can be a characteristic of the node or can be caused by the environment of the node, such as mountain ranges or weather.

For example, with reference to FIG. 1, assume that node 130H is remotely located from the clusterhead 130A, and that the transmissions of node 130H are not received by the clusterhead 130A. However, by virtue of their proximity to node 130H, the transmissions of node 130H can be received by the nodes 130D, 130E and 130F. Thus, when node 130H transmits network state information, the same network state information can be received by nodes 130D, 130E and 130F.

Subsequently, each of the nodes 130D, 1301E and 130F can transmit their own network state information. The transmissions of nodes 130D, 130E and 130F can include network state information regarding themselves, as well as that previously received from node 130H. However, the network state information of node 130H that is included in the transmission of 130D, 130E and 130F is network state information that has been compressed or summarized by the nodes 130D, 130E and 130F. In other words, before transmitting the network state information previously received from node 130H, the nodes 130D, 130E and 130F can process node 130H's network state information by summarizing the network state information, and thereby reducing an amount of data that is forwarded in the subsequent transmission. In this manner, as network state information is transmitted through the cluster 130 to the clusterhead 130A, the network state information can be summarized. As a result, the amount of bandwidth required for administration of the ad-hoc network can be reduced, and thus increase the amount of available bandwidth for application data.

The processing that a particular node can perform on a received network state information can include any form of calculation that reduces an amount of data that is transmitted in a subsequent transmission. Calculations include averaging, statistical analysis, and the like. In addition to reducing an amount of bandwidth necessary for administrative data, such distributed computation, also serves to reduce the workload of the clusterhead node. Summarizing can involve aggregating the data from individual elements and presenting only the aggregate information instead of individual pieces of information. State summarization can be performed using primitives like sum, maximum, minimum, average, standard deviation, variance and other statistical measures for values of state variables. For example, if the total network bandwidth is queried, then each clusterhead collects link-state information in the cluster, computes the aggregate into a single quantity and disseminates only the computed quantity in the network. Other clusterheads similarly combine the received information with the computed bandwidth for their clusters and propagate the summarized information further. Thus, the central monitoring station can eventually receive the aggregated bandwidth for the whole network as a single quantity. The query can be modified with the appropriate filters if information about specific parts of the network or individual nodes is desired. The basic premise is that network administrators are typically only concerned about general network statistics such as "average load", etc., and by building upon this assumption an amount of information shipped throughout the network can be reduced.

Additionally, nodes, such as node 130H, that are remotely located from the clusterhead 130A can transmit network state information differently than nodes located less remotely from the clusterhead. For example, the remote node 130H can periodically transmit at a higher rate than nodes 130D, 130E and 130F, but transmit less data in each transmission. Specifically, assuming that network state information takes the form of MIBs, the node 130H can transmit network state information at a rate of once every 5 seconds with each transmission including 2 MIBs. Nodes 130D, 130E and 130F located closer to the clusterhead 130A can transmit network state information at a rate of once every 10 seconds, with each transmission including 3 MIBs. Thus, for example, the remote node 130H can transmit 4 MIBs during 10 second interval (i.e., two iterations of 2 MIBs/5 seconds) to nodes 130D, 130E and 130F, and the nodes 130D, 130E and 130F can compress or summarize the 4 MIBs received from node 130H, and transmit only 3 MIBs. While in this example, the ad-hoc network is relatively simple, in more complex networks, it should be understood that such summarization and re-transmission can continue until the network state information reaches the clusterhead. By using such a technique, data can be collected at a faster rate from the outer edges of the ad-hoc network and be aggregated as it approaches the clusterhead.

Figure 3:
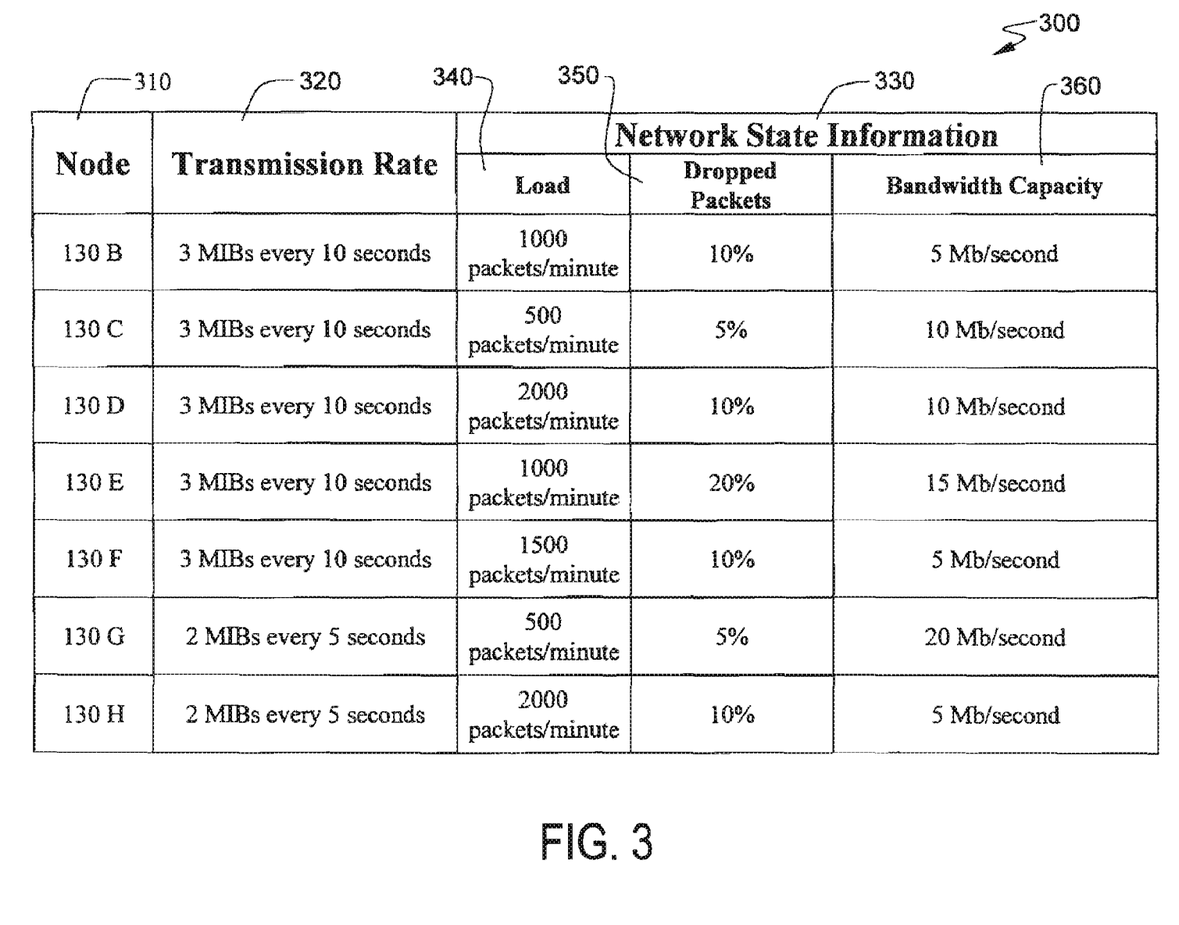
FIG. 3 is a table showing a transmission rate and network state information corresponding to each of the nodes in a cluster.

FIG. 3 is a table 300 showing a transmission rate and network state information corresponding to each of the nodes 130B-H in cluster 130. The table includes a node identifier field 310 that identifies the particular node 330B-H of the cluster 130. The table further includes a transmission rate field 320 showing the transmission rate corresponding to each of the nodes. For example, node 330B transmits 3 MIBs every 10 seconds, while node 130H transmits 2 MIBs every 5 seconds. As described above, the transmission rate for each of the nodes can be adjusted based on a particular node's characteristics, such as proximity to a clusterhead. As shown in table 300, nodes have been assigned transmission rates consistent with the above example. Specifically, nodes 130B-130F transmit at 3 MIBs per second, while nodes 130G and 130H transmit at 2 MIBs per second. While for the sake of simplicity, only two levels of transmission rates have been shown, it should be understood that any number of levels can be assigned to the various nodes based on the characteristics of the nodes.

Field 330 includes exemplary network state information, such as a load field 340, dropped packets field 350, and bandwidth capacity field 360. As shown in this exemplary embodiment, node 330B has a load of 1000 packets/minute, a dropped packet rate of 10% and a bandwidth of 5 Mb/seconds. In a similar manner, node 130H has a load of 2000 packets per minute, a dropped packet rate of 100%, and a bandwidth capacity of 5 Mb/seconds.

With reference to table 300, during operation it can be seen that the node 130H transmits network state information at a rate of 2 MIBs every 5 seconds. Thus, the node 130H may transmit load information and dropped packet information in a first transmission, and subsequently transmit dropped packet information and bandwidth capacity 5 seconds later in a second transmission.

The transmissions from node 130H can be received by nodes 130D, 130E and 130F. The received values of node 130H can be subsequently processed by the receiving node before they are retransmitted. For example, the node 130E can receive the load and dropped packet values (2000 packets/minute and 10%) in a first transmission from node 130H, and the dropped packets and bandwidth capacity values (10% and 5 Mb/seconds) in a second transmission. Node 130E can then average the values with node 130E's own network state information (i.e., load 1000 packets/minute, dropped packets 20%, and bandwidth capacity of 15 Mb/second). The average values transmitted by node 130E would then be a load of 1500 packets/minute, a dropped packets value of 15% and a bandwidth capacity of 10 Mb/seconds. Thus, information transmitted to a subsequent node, and possibly the clusterhead, has been compressed or summarized, thereby reducing an amount of bandwidth required for administrative data by the ad-hoc network.

Figure 4:
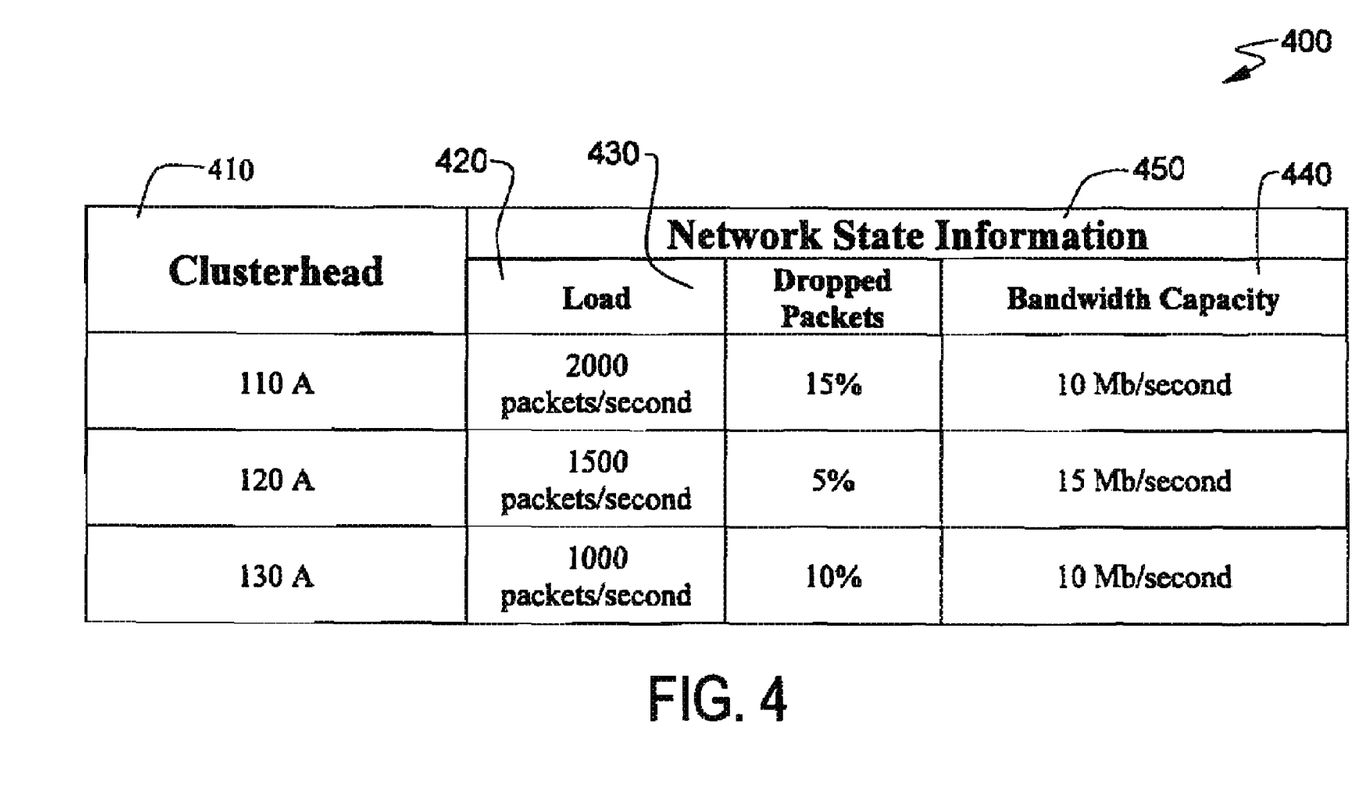
FIG. 4 is a table showing the network state information corresponding to clusterheads of clusters shown in FIG. 1.

FIG. 4 is a table 400 showing the network state information corresponding to each clusterhead 110A, 120A and 130A for each of the clusters shown in FIG. 1. The table includes a clusterhead identifier field 410 that identifies the particular clusterhead 110A, 120A and 130A. The table also includes exemplary network state information, such as a load field 420, a dropped packets field 430, and a bandwidth capacity field 440.

As shown in table 400, each of the clusterheads receive network state information corresponding to each of the clusters. The network state information contained in the table 400 corresponds to the compressed or summarized information received (directly or indirectly) from each of the nodes in the respective cluster. For example, taking again cluster 130, the network state information includes a load value of 1000 packets per second, a dropped packets value of 10%, and a bandwidth capacity value of 10 Mb per second. These values correspond to the averaged individual values for that cluster shown in table 300 of FIG. 3.

Figure 5:
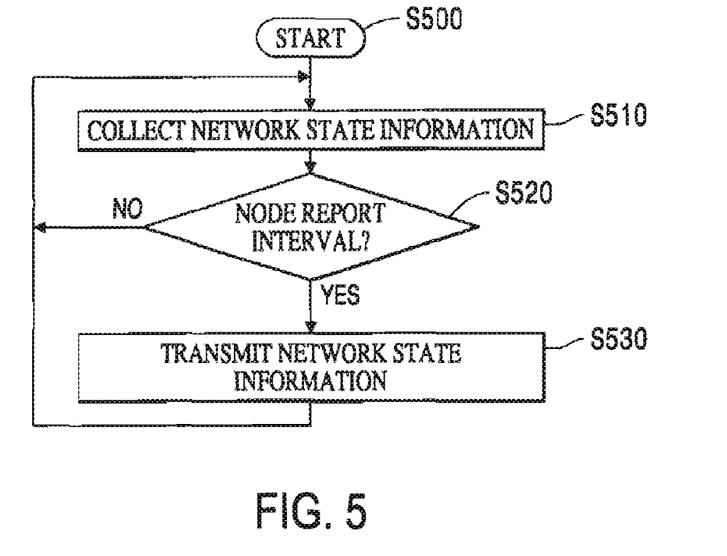
FIG. 5 is a flowchart outlining one exemplary process for a node to transmit its network state information.

FIG. 5 is a flowchart outlining one exemplary process for an individual node of cluster to transmit its network state information. The process begins in step S500 and proceeds to step S510, where the node collects network state information. The information can be collected by various well known means, and stored in a resident memory of the node. The process then proceeds to steps S520. In steps S520, the decision is made by the node as to whether the collected network state information should be transmitted. Specifically, the node transmits network state information at a report interval, for example, 4 MIBs per second. The report interval can be calculated from an internal clock of the node or received clock signal. If the node determines that it is not time to transmit network state information, then the process returns to steps S510, where the node continues to collect network state information; otherwise, the process proceeds to steps S530.

In steps S530, the node can transmit network state information to various other nodes in the cluster. After making a transmission, the process returns to steps S510, where the node continues to collect network state information until a next node report interval occurs.

Figure 6:
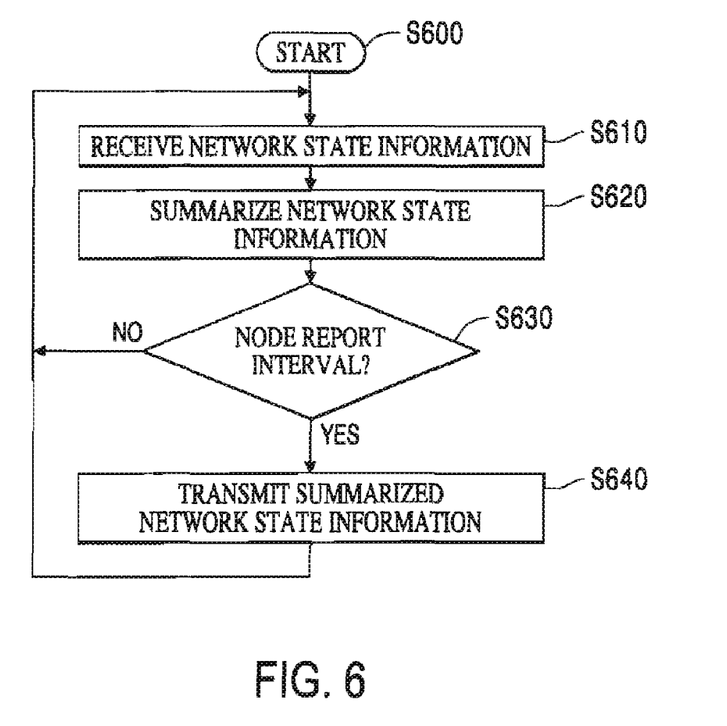
FIG. 6 is a flowchart outlining one exemplary process of an intermediate node in the cluster of the ad-hoc network.

FIG. 6 is a flowchart outlining one exemplary process of an intermediate node in the cluster of the ad-hoc network. The process begins in step S600, and proceeds to step S610. In step S610 network state information is received. The network state information can be received by various sensors or otherwise that are part of the node. The process then proceeds to step S620. At step S620, the network state information can be compressed or summarized. As described above, network state information received from various other nodes, may be combined with the network state information of present node and calculations may be performed thereon. Again, for example, the values of various nodes may be averaged or some statistical standard deviation calculated from the various received and measured network state information values. Once summarized, the process can proceed to step S630. In step S630, a decision is made as to whether to transmit the summarized network state information. Specifically, if the node senses that a report internal has not passed, then the process returns to step S610, where the node continues to receive network state information; otherwise, the process proceeds to step S640.

In step S640, the summarized network state information is transmitted. Specifically, the network state information can be transmitted for receipt by a subsequent node. The process then returns to step S610, where the node continues to receive network state information.

As shown in FIG. 2, the method of this invention is preferably implemented on a programmed processor. However, the node can be implemented on a general purpose or special purpose computer, a programmed microprocessor or microcontroller and peripheral integrated circuit elements, and an applications specific integrated circuit (ASIC), or other integrated hardware electronic or logic circuit, such as a discreet element circuit, a programmable logic device, such as a PLD, PLA, FPGA, or PAL, or the like. In general, any device on which resides a finite state machine capable of implementing the flowchart shown in FIGS. 5 and 6 can be used to implement the node functions of this invention.

While this invention has been described in conjunction with the specific embodiments thereof, it is evident that many alternatives, modifications and variations will be apparent to those skilled in the art. Accordingly, preferred embodiments to this invention as set forth herein are intended to be illustrative, not limiting. There are changes that may be made without departing from the spirit and scope of the invention.

What is claimed is:

1. An ad-hoc network, comprising:
   at least one processor; and
   at least one memory, the at least one memory storing instructions which when executed cause the at least one processor to perform as:
   a clusterhead node; and
   a plurality of nodes associated with the clusterhead, at least one of the plurality of nodes is a remote node and at least one is an intermediate node, the remote node indirectly communicating with the clusterhead through the intermediate node, wherein
   the network state information includes at least one of load, dropped packets and bandwidth capacity,
   the intermediate node receives the network state information transmitted by the remote node and subsequently re-transmits the network state information received from the remote node in a summarized form,
   the intermediate node summarizes the network state information of the remote node by averaging at least a portion of the network state information of the remote node with the network state information of the intermediate node, and
   each of the plurality of nodes collect network state information and transmit at least a portion of the collected network state information at a predetermined rate, the remote node transmits a smaller amount of information at a higher rate relative to that of the intermediate node, and the intermediate node transmits a larger amount of information at a lower rate relative to that of the remote node.

2. The ad-hoc network according to claim 1, the intermediate node summarizes the network state information of the remote node by combining at least a portion of the network state information of the remote node with the network state information of the intermediate node before re-transmitting.

3. The ad-hoc network according to claim 1, the network state information being management information based (MIB).

4. The ad-hoc network according to claim 1, each node being a wireless node including a controller coupled to a receiver, transmitter and memory, the network state information of the node being stored in the memory and transmitted under the control of the controller by the transmitter, along with any network state information previously received by the receiver.

5. The ad-hoc network according to claim 1, wherein the intermediate node receives the network state information transmitted by the remote node and subsequently re-transmits the network state information received from the remote node along with the network state information of the intermediate node in a summarized form.

6. The ad-hoc network according to claim 1, wherein each node includes a proximity device that determines proximity to the clusterhead, and a determination of whether a node is an intermediate node or remote node is made based on a determination of the proximity device.

7. The ad-hoc network according to claim 6, wherein node's proximity is measured by at least one of distance to the clusterhead, hops to the clusterhead, and signal strength of the node or surrounding nodes.

8. The ad-hoc network according to claim 6, wherein node's proximity is based on GPS measurements.

9. A method of managing an ad-hoc network having a plurality of nodes including a clusterhead node and a plurality of nodes associated with the clusterhead, the method comprising:
   collecting network state information at a first node;
   receiving network state information transmitted by other nodes at the first node;
   summarizing at least a portion of the collected and the received network state information; and
   transmitting the summarized network state information from the first node, wherein
   the other nodes transmit a smaller amount of network state information at a higher rate relative to that of the first node and the first node transmits a larger amount of network state information at a lower rate relative to that of the other nodes,
   the network state information includes at least one of load, dropped packets and bandwidth capacity, and the first node summarizes the network state information of the other nodes by averaging at least a portion of the network state information of the other nodes with the network state information of the first node.

10. The method of managing the ad-hoc network according to claim 9, further comprising:
averaging at least a portion of the collected and the received network information.

11. The method of managing the ad-hoc network according to claim 9, the network state information being management information based (MIB).

12. The method of managing the ad-hoc network according to claim 9, wherein each node includes a proximity device that determines proximity to the clusterhead, and a determination of whether a node is a first node or other node is made based on a determination of the proximity device.

13. The method of managing the ad-hoc network according to claim 12, wherein node's proximity is measured by at least one of distance to the clusterhead, hops to the clusterhead, and signal strength of the node or surrounding nodes.

14. The method of managing the ad-hoc network according to claim 12, wherein node's proximity is based on GPS measurements.

* * * * *